(12) United States Patent
Fu

(10) Patent No.: US 6,706,785 B1
(45) Date of Patent: Mar. 16, 2004

(54) METHODS AND COMPOSITIONS RELATED TO LASER SENSITIVE PIGMENTS FOR LASER MARKING OF PLASTICS

(75) Inventor: Guoyi Fu, Savannah, GA (US)

(73) Assignee: Rona/EMI Industries, Inc., Hawthorne, NY (US)

( * ) Notice: Subject to any disclaimer, the term of this patent is extended or adjusted under 35 U.S.C. 154(b) by 0 days.

(21) Appl. No.: 09/506,701

(22) Filed: Feb. 18, 2000

(51) Int. Cl.⁷ .................................................. C08K 9/00
(52) U.S. Cl. ..................... 523/200; 523/210; 523/216; 106/436; 106/466; 106/479; 106/480; 106/482
(58) Field of Search ................................. 523/200, 210, 523/216; 106/436, 466, 479, 480, 482

(56) References Cited

U.S. PATENT DOCUMENTS

| | | |
|---|---|---|
| 4,075,029 A | 2/1978 | Nuss |
| 4,206,100 A | 6/1980 | Kyo et al. |
| 4,450,012 A | 5/1984 | Messer et al. |
| 5,053,440 A | 10/1991 | Schueler et al. |
| 5,075,195 A | 12/1991 | Babler et al. |
| 5,076,849 A | 12/1991 | Vapaaoksa |
| 5,116,664 A | 5/1992 | Kimura et al. |
| 5,137,575 A | 8/1992 | Yasuki et al. |
| 5,206,280 A | 4/1993 | Williams |
| 5,364,467 A | 11/1994 | Schmid et al. |
| 5,451,252 A | 9/1995 | Elfenthal et al. |
| 5,489,639 A | 2/1996 | Faber et al. |
| 5,578,120 A | 11/1996 | Takahashi et al. |
| 5,591,797 A | 1/1997 | Barthel et al. |
| 5,618,580 A | 4/1997 | Oshima et al. |
| 5,667,580 A | 9/1997 | Babler |
| 5,698,205 A | 12/1997 | Bruckner et al. |
| 5,698,483 A | 12/1997 | Ong et al. |
| 5,717,018 A | 2/1998 | Magerstedt et al. |
| 5,750,318 A | 5/1998 | Lambert et al. |
| 5,753,026 A | 5/1998 | Kuntz et al. |
| 5,772,978 A | 6/1998 | Baily et al. |
| 5,798,037 A | 8/1998 | Peacock |
| 5,824,144 A | 10/1998 | He et al. |
| 5,840,267 A | 11/1998 | Saegusa |
| 5,840,791 A | 11/1998 | Magerstedt et al. |
| 5,855,862 A | 1/1999 | Grenier et al. |
| 5,866,644 A | 2/1999 | Mercx et al. |
| 6,365,973 B1 * | 4/2002 | Koning .................. 257/772 |

FOREIGN PATENT DOCUMENTS

| | | |
|---|---|---|
| WO | 9803583 | 1/1998 |
| WO | 9835096 | 8/1998 |

\* cited by examiner

*Primary Examiner*—Edward J. Cain
(74) *Attorney, Agent, or Firm*—Millen, White, Zelano & Branigan, P.C.

(57) ABSTRACT

Platelet-shaped substrates that are coated with metal oxides and that are useful in the laser marking of plastics are disclosed. The platelet-shaped substrates may be employed as an additive to plastic for laser marking of a wide variety of plastics and for use with a number of different laser types.

37 Claims, No Drawings

METHODS AND COMPOSITIONS RELATED TO LASER SENSITIVE PIGMENTS FOR LASER MARKING OF PLASTICS

BACKGROUND OF THE INVENTION

The invention relates to the field of laser sensitive pigments for laser marking of plastics. Laser marking techniques may be used to replace conventional ink-printing techniques in marking plastic objects for identification or safety purposes, including markings such as date or batch codes, bar codes, and serial numbers. Laser marking is a clean and rapid process which produces permanent, rub-fast, scratch proof, and solvent resistant markings. The laser marking process does not generate waste or involve the use and disposal of hazardous solvents. Laser sensitive pigment additives having broad application with a variety of laser types and resin types would facilitate the laser marking process.

SUMMARY OF THE INVENTION

In accordance with the current invention, it has been discovered that laser sensitive pigments comprising particle substrates coated with metal oxides have wide ranging utility in the laser marking of plastics. The laser sensitive pigments may be used in conjunction with a wide variety of plastic compositions and in conjunction with different laser types.

As used herein, laser sensitive pigments means pigments that are capable of absorbing sufficient laser energy to generate a mark on a plastic substrate containing the pigment.

The metal oxide coating comprises at least one marking component which is CuO, $MoO_3$, $WO_3$, $V_2O_5$, $Ag_2O$, or $PbO_2$. The metal oxide coating may also comprise a host substrate component of either $TiO_2$ or $SnO_2$ or a mixture of $TiO_2$ and $SnO_2$.

Laser marks on plastic are typically the result of carbonization of irradiated polymer material. In most instances, satisfactory laser marking quality cannot be achieved with the polymer material alone because carbonization does not occur effectively or selectively. The polymer material either does not absorb enough laser energy for carbonization to take place, or the polymer material becomes excessively burned at the surface when laser energy is applied. Laser sensitive additives can enhance the quality of laser marking. However, because the mechanisms behind laser marking are different for different laser types, additives specific to the laser type have typically been employed to obtain optimal laser marking results. $CO_2$ lasers have a laser frequency in the mid-infrared (IR) region (λ=10600 nm), and preferred additives for $CO_2$ lasers have strong vibrational energy absorption in the mid-IR region and are highly heat resistant. The additives act as secondary heaters that absorb laser energy and raise the temperature of the surrounding polymer to very high levels, resulting in carbonization of the polymer. The laser markings are primarily the result of thermal processes. With ultra-violet (UV) excimer lasers (λ<400), laser marks are mainly realized via photochemical processes. Nd:YAG lasers have wavelength frequencies in between the two extremes for $CO_2$ lasers and UV lasers, with frequencies at 1064 nm (near IR) and at 532 nm (visible) for an optically doubled frequency. For Nd:YAG lasers, both vibrational energy absorption and photochemical processes are necessary to achieve high quality marks.

As discovered herein, certain particle substrates coated with certain metal oxides may be employed as laser sensitive pigments for use in laser marking of plastics using different types of lasers. Sensitivity of the pigments to a particular laser type is primarily attributable to individual components of the coated substrates, although the other components may enhance laser sensitivity and marking contrast. For example, sensitivity to a $CO_2$ laser is primarily attributable to the particle substrate. Sensitivity to near IR and visible lasers is primarily attributable to the marking component(s) of the metal oxide layer, namely CuO, $MoO_3$, $WO_3$, $V_2O_5$, $Ag_2O$, or $PbO_2$ and sensitivity to UV lasers is primarily attributable to the host component(s) of the metal oxide layer, namely $SnO_2$ or $TiO_2$. Moreover, $TiO_2$ or $SnO_2$, or a combination thereof, in the coating layer enhances the contrast of the $CO_2$ laser marks compared with uncoated mica. This result may be due to the fact that the coating oxide layer increases the selectivity of the laser induced carbonization and, as a result, its yield. The oxide layer may also become partially reduced upon laser irradiation, forming dark-colored sub-oxides which increase the marking contrast.

The laser sensitive pigments of the invention are relatively thermally stable and exhibit good dispersability and minimal color effects. During calcination, the metal oxide coating layer crystallizes into nanometer sized crystals after calcination. Due to their small particle size, they show relatively high transparency and are therefore compatible with other colorants used in the final applications. Additionally, because the nanometer-sized particles are imbedded onto micrometer-sized particles, they can be processed more easily as micrometer-sized particles.

A preferred substrate particle is a platelet-shaped substrate. Although particle substrates with other geometries may be employed in accordance with the invention, platelet-shaped substrates are preferred because they tend to orient themselves when dispersed in a plastic matrix so that their larger surface faces are parallel to the object surfaces. This orientation maximizes the efficiency of the pigment particles to couple laser energy. The use of particle substrates is preferred over substrate free powders. A thin layer coating of metal oxides on transparent substrates reduces the necessary loading levels in comparison to substrate free powders, and thereby reduces the color effect of the oxides. A reduced color effect from the oxides makes the laser sensitive pigment additive more compatible with other colorants. Coated substrates are also more easily dispersed within the resin composition than substrate free powders.

Platelet-shaped substrates include, but are not limited to, the following materials: natural or synthetic mica such as muscovite, phlogopite, and biotite; other sheet silicates, such as talc, kaolin or sericite; glass platelets, silica flakes and alumina flakes. Mica particles are preferred because of its relatively high absorption of laser energy, and therefore a higher sensitivity when used in conjunction with $CO_2$ lasers than other platelet-shaped substrates. Wet-ground muscovite is a preferred mica substrate. Mica particle sizes, as measured by light scattering methods, are preferably in the range of about 1 to about 150 μm, more preferably in the range of about 5 to about 100 μm, and most preferably in the range of about 10 to about 50 μm. The particle size range may affect marking quality in that large particles tend to provide a higher contrast in the mark, but also decrease the definition and smoothness of the mark, particularly for fine marks.

The components of the coating layer are chosen to optimize laser sensitivity. Combinations of CuO with $MoO_3$ or $WO_3$ showed the best laser sensitivity marking contrast for the Nd:YAG laser, although any single component of these oxides also yielded fairly good marks. $V_2O_5$ may also be used in lieu of $MoO_3$ or $WO_3$, although the use of $V_2O_5$ may add a much stronger color to the material, which may be incompatible for use with light colored systems. $Ag_2O$ and $PbO_2$ may be used as marking components in the metal oxide layer. However, their use may be constrained because of their higher toxicity. These marking oxides may be used alone as the coating layer on mica flakes. Preferably, however, the marking oxides are further mixed with $TiO_2$ or $SnO_2$ or a combination thereof, wherein the $TiO_2$, $SnO_2$, or the $TiO_2/SnO_2$ combination forms a host structure for the mixed oxide. The use of a host structure is advantageous in that the coating layer is more strongly bound to the substrate because $TiO_2$ and $SnO_2$ exhibit greater adherence to substrates than other oxides. The use of a host structure is also advantageous in that it increases the thermal stability of the mixed oxides and reduces the color effect of the mixed oxide because they are diluted by a colorless matrix. Additionally, the use of a $TiO_2$ or $SnO_2$ host structure enhances the sensitivity of the laser sensitive pigments to UV excimer lasers.

With an Nd:YAG laser, the marking sensitivity is mainly attributable the marking components of the coating layer, i.e. CuO, $MoO_3$, $WO_3$, or a combination thereof. However, the host components, i.e. $TiO_2$ or $SnO_2$, or a combination thereof, have some affect on the marking sensitivity. Materials with an $SnO_2$ host layer show slightly lower sensitivity than materials with a $TiO_2$ host layer. However, materials with an $SnO_2$ host layer are more transparent than materials with a $TiO_2$ host layer; therefore, materials with a $SnO_2$ host layer may be more compatible with certain colorants in the plastic. The combination of CuO with $MoO_3$ or $WO_3$ shows greater sensitivity than either $MoO_3$ or $WO_3$ alone, although the combination does not show significant improvement compared to CuO alone. However, the combination is often preferable over CuO alone because the combination shifts the color of the product from a dark grayish color to a slightly yellowish color, which is more compatible with light colored systems. The Cu/W combination shows a lighter yellowish color than the Cu/Mo combination. Generally, the slightly colored additives add little color effect to the plastic objects because a very low percentage of the pigment additive is required to reach high sensitivity. The color and transparency of the additives can be fine-tuned by adjusting the oxide composition of the coating layer to suit the end application.

The weight ratio of host component to marking component in the mixed metal oxide layer is typically about 1 to about 0.1–0.4, preferably about 1 to about 0.2–0.4. For example, preferred mixed metal oxide layers are the following:

(a) 100 $TiO_2$ and 10–40 CuO or 10–30 $MoO_3$;
(b) 100 $SnO_2$ and 10–40 CuO or 10–30 $MoO_3$;
(c) 100 of a total of a mixture of $TiO_2$ and $SnO_2$ plus 10–40 CuO or 10–30 $MoO_3$;
(d) 100 $TiO_2$, 10–20 CuO, and 10–20 $MoO_3$ or 10–20 $WO_3$;
(e) 100 $SnO_2$, 10–20 CuO, and 10–20 $MoO_3$ or 10–20 $WO_3$;
(f) 100 of a total of a mixture of $TiO_2$ and $SnO_2$, 10–20 CuO, and 10–20 $MoO_3$ or 10–20 $WO_3$;
(g) 100 $TiO_2$, 10–20 CuO, 5–10 $MoO_3$, and 5–10 $WO_3$;
(h) 100 $SnO_2$, 10–20 CuO, 5–10 $MoO_3$, and 5–10 $WO_3$;
(i) 100 of a total of a mixture of $TiO_2$ or $SnO_2$, 10–20 CuO, 5–10 $MoO_3$, and 5–10 $WO_3$.

Typically, mica particles of the invention have a metal oxide coating layer that is from about 30 nm to about 300 nm in thickness, preferably about 60 nm to about 150 nm.

The coating of the particle substrates with the oxide mixtures may be accomplished by precipitating the metal oxide components, either simultaneously or in sequence, onto the substrates in the medium of deionized water. The substrate material is first suspended in water, at a concentration of preferably about 50 to about 200 grams per liter. The solutions of coating precursor materials are delivered into the reactor at suitable inflow rates and pH values, under controlled temperature and agitation. It is preferable that precipitation of tungstate or molybdate marking components is accomplished in conjunction with precipitation of the host components. The relatively high solubility of tungstate or molybdate species in a broad pH range may result in incomplete precipitation if these oxides are precipitated individually in sequence. It is also preferable that the precursor solutions for $WO_3$ or $MoO_3$ are prepared by dissolving $WO_3$ and/or $MoO_3$ precursor materials such as in a NaOH solution, which is used as a neutralizing agent in the $TiO_2$ and/or $SnO_2$ precipitation. Typical $WO_3$ and $MoO_3$ precursor materials include anhydrous or hydrated oxides, acid or polyacid forms of tungstate or molybdate, alkoxides, and sodium or potassium salts of mono- or polytungstates or molybdates. The oxides, $WO_3$ and $MoO_3$, and the dihydrated sodium salts, $NaWO_4 \cdot 2H_2O$ and $NaMoO_4 \cdot 2H_2O$, are preferred because of their broad availability and low cost. However, sodium or potassium salt may be used in a similar manner. The concentration of the NaOH solution can vary broadly but preferably is in the range of about 10% to about 30% in deionized water. The concentration of $WO_3$ and/or $MoO_3$ may be adjusted in accordance with the desired concentration of these components in the final coating layer. The preferred precursor materials for $TiO_2$ and $SnO_2$ precipitation are titanium tetrachloride and stannic chloride solutions, respectively, in a concentration range from about 300 to about 500 grams per liter. Other precursor materials that may be employed include $Ti(SO_4)_2$, $TiBr_4$, and titanium alkoxides for Ti and $Sn(SO_4)_2$, $SnBr_4$ and tin alkoxides for Sn. The preferred pH range for the precipitation is about 1.5 to about 2.5. At higher pH values, agglomeration of the substrates may occur, leading to poor coating quality.

The precipitation of copper species may be accomplished in various ways. A copper salt, preferably cupric chloride or alternatively cupric sulfate, nitrate, acetate or hydroxide, may be first dissolved in the Ti and/or Sn precursor solution in a suitable amount and then delivered into the coating reactor together with the Ti and/or Sn species for precipitation. However, during the first coating stage, where Ti and/or Sn oxides, as well as tungsten and/or molybdenum species, are essentially completely precipitated, the cupric salt is only partially precipitated due to its relatively high solubility at this pH range (1.5 to 2.5, as discussed above). To complete copper precipitation, the pH of the suspension needs to be slowly adjusted to the range of about 5 to about 6 with a NaOH solution. Alternatively, the addition of the copper precursor may be delayed until after the $TiO_2$ and/or $SnO_2$ precipitation, with or without W and/or Mo species precipitation, have been completed at lower pH. The cupric salt is then added to the suspension and afterwards the pH is slowly raised to the desired value. In the case that the CuO is to be incorporated into the $TiO_2$ and/or $SnO_2$ layer without the presence of W and Mo species, the Cu precipitation may also be completed at lower pH by using a reducing agent, for example, sodium tetrahydridoborate ($NaBH_4$). In this process, a suitable amount of cupric salt is first dissolved in the Ti and/or Sn precursor solution and a suitable amount of $NaBH_4$ is dissolved in the NaOH solution. Then the two solutions are introduced into the substrate suspension for precipitation in a similar way as described above.

Laser markable plastics and methods of laser marking of plastics are also contemplated as part of the invention. The laser sensitive pigments of the invention may be used in conjunction with a wide variety of polymers including, but not limited to, polyethylene, polypropylene, polystyrene, polyesters, polycarbonate, polyvinyl chloride, nylon, ABS, etc. For each type of resin, routine tests are needed to determine the optimal laser working conditions and pigment loading levels. Procedures and protocols for carrying out such routine tests are well known to those of skill in the art. Typical loading levels of laser sensitive pigment in the plastic composition are from about 0.1% to about 2%, preferably about 0.1% to about 1%, and more preferably about 0.25% to about 0.5%. Loading levels, as used herein, refers to concentrations of laser sensitive pigments in laser markable portions of the plastic material. Laser markable portions are portions of the plastic material that are accessible to the laser, For example, loading levels in the above described ranges may be localized near the surface of the object and the object may have minimal levels of laser sensitive pigment in areas that may not be contacted with the laser, such as the interior of the object.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

In the following examples, all parts and percentages are by weight unless otherwise indicated.

Example 1

$TiO_2/CuO$ Mixed Oxides Coating on Mica

The coating experiments were performed using a 5 L reactor equipped with a stirrer, a pH meter, two liquid pumps to deliver the precursor solutions, and a circulating water bath to control the temperature. A Ti/Cu precursor solution was prepared by dissolving a suitable amount of solid $CuCl_2.2H_2O$ in a $TiCl_4$ solution in HCl to a desired Ti/Cu molar ratio, typically 85/15. The mica substrates were suspended in deionized water to a desired concentration (typically, 75 g/l) and were then added to the reactor. The pH of the mica suspension was adjusted to the desired value, typically 1.6 to 2.4, and the precursor solution was slowly pumped in. A constant pH was maintained by simultaneous delivery of a base solution (typically, 20% NaOH). During the coating process, the temperature and agitation were controlled at constant values. When a desired amount of precursor solution was delivered, the pH was slowly raised to 5.5 and maintained at 5.5 for about 30 minutes. Most of the copper species precipitation took place during the pH working up period, and the hydrous titanium oxide precipitation was virtually complete before the pH working up period. The coated mica product was filtered, washed, dried in an oven at 110° C., and calcined in a kiln, typically at a temperature of 500° C. to 800° C. The product was then dispersed in plastics for laser marking tests.

$SnO_2/CuO$ or $TiO_2/SnO_2/CuO$ coated mica particles were prepared as described above, with the exception that the $TiCl_4$ precursor solution was replaced by a $SnCl_4$ solution in HCl or mixture of $TiCl_4$ and $SnCl_4$ at a desired ratio.

Example 2

$TiO_2/CuO$ Mixed Oxides Coating on Mica

Mica particles coated with $TiO_2/CuO$ were also prepared as follows. The mica suspension and the Ti/Cu precursor solution were prepared as described in Example 1. The coating and product finishing were also performed as described in Example 1. However, the NaOH solution used to control the pH of the coating reaction was mixed with a suitable amount of $NaBH_4$. The concentration of $NaBH_4$ in the NaOH solution was determined according to the estimation of the amount of copper employed and the amount of NaOH needed to precipitate the Ti/Cu ion mixture. The amount of $NaBH_4$ delivered into the reactor should be 0.5 moles or more for every mole of $CuCl_2.2H_2O$ used to ensure complete reduction of copper ions. When an excess amount of $NaBH_4$ was used, Ti(IV) ions would also be partially reduced and the characteristic purplish blue color of Ti(III) ions would observed. During the product finishing process, both Cu and Ti(III) species would be re-oxidized. The coating composition in the final product would still be $TiO_2/CuO$. In this process, it was not necessary to bring the pH up at the end of the coating as was in the case of Example 1. If sufficient $NaBH_4$ was employed, the Cu ions would be completely reduced into tiny Cu metal particles and precipitated together with hydrous Ti oxide at lower pH. In this process, the copper species would also be more homogeneously incorporated into the titanium dioxide layer than it was in the case of Example 1. However, there was no significant difference observed in laser marking sensitivity for the products prepared in both processes.

Example 3

$TiO_2/MoO_3$ Mixed Oxides Coating

The mica suspension was prepared in a similar way as in Example 1. The substrate coating and product finishing were also performed in the same process as in Example 1. However, the precursor solution contained $TiCl_4$ in HCl only and the base solution was prepared by dissolving a suitable amount of $MoO_3$ in a base, typically 20% NaOH. The concentration of $MoO_3$ was adjusted according to the amount of $TiCl_4$ employed and the amount of NaOH needed to maintain the reaction at the desired precipitation pH (typically 1.5–2.4). The molar ratio of Ti/Mo should be within the range from 95/5 to 75/25. The calcination of the final product should be done at 600° C. or lower to minimize possible calcination damage to the coating layer.

The $SnO_2/MoO_3$ or $TiO_2/SnO_2/MoO_3$ coatings were performed in exactly the same manner. However, the $TiCl_4$ solution was replaced with a $SnCl_4$ solution or a mixture solution of $TiCl_4$ and $SnCl_4$ at a desired ratio.

Examples 4

$TiO_2/CuO/MoO_3$ Mixed Oxides Coating

The mica coating and product finishing were performed in the same way as in Example 3. However, the acid solution was prepared by dissolving $CuCl_2.2H_2O$ in $TiCl_4$ solution as in Example 1. The concentration of Cu in the precursor solution and the concentration of Mo in the base solution were adjusted so that a desired molar ratio of these oxide components in the final product would be achieved. A typical molar ratio of Ti/Cu/Mo was 74/13/13. Due to the Cu ions involved, the final pH of the coating suspension should be raised to about 5.5 to ensure a complete precipitation of the copper species as in Example 1.

$TiO_2/CuO/WO_3$, $SnO_2/CuO/MoO_3$ or $TiO_2/CuO/WO_3/MoO_3$ coatings were achieved using the exactly same process. However, the precursor and base solutions were so prepared that a desired composition in a final product could be achieved. $Na_2WO_4.2H_2O$ was used as a source of $WO_3$.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all patent applications, patents, and publications cited herein are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A laser sensitive pigment comprising at least one platelet-shaped substrate coated with a mixed metal oxide coating, wherein the mixed metal oxide coating comprises a host component and a marking component, wherein the host component comprises at least one of $TiO_2$ or $SnO_2$, and wherein the marking component comprises at least one of CuO, $MoO_3$, $WO_3$, $V_2O_5$, $Ag_2O$, or $PbO_2$, and wherein the mixed metal oxide coating comprises a host component/marking component weight ratio of 1/0.1–0.4.

2. A laser sensitive pigment according to claim 1, wherein the mixed metal oxide coating comprises a host component/marking component weight ratio of 1/0.2–0.4.

3. A laser sensitive pigment according to claim 1, wherein the marking component comprises at least one of CuO, $MoO_3$, $WO_3$ or $V_2O_5$.

4. A laser sensitive pigment according to claim 1, wherein the marking component comprises at least one of $Ag_2O$, or $PbO_2$.

5. A laser sensitive pigment according to claim 3, wherein the marking component comprises CuO in combination with $MoO_3$ or $WO_3$.

6. A laser sensitive pigment according to claim 1, wherein the platelet-shaped substrate comprises mica particles.

7. A laser sensitive pigment according to claim 5, wherein the platelet-shaped substrate comprises mica particles.

8. A laser sensitive pigment according to claim 5, wherein the mixed metal oxide coating is, in parts by weight, selected from the group consisting of:
   (a) 100 $TiO_2$ and 10–40 CuO or 10–30 $MoO_3$;
   (b) 100 $SnO_2$ and 10–40 CuO or 10–30 $MoO_3$;
   (c) 100 of a total of a mixture of $TiO_2$ and $SnO_2$ plus 10–40 CuO or 10–30 $MoO_3$;
   (d) 100 $TiO_2$, 10–20 CuO, and 10–20 $MoO_3$ or 10–20 $WO_3$;
   (e) 100 $SnO_2$, 10–20 CuO, and 10–20 $MoO_3$ or 10–20 $WO_3$;
   (f) 100 of a total of a mixture of $TiO_2$ and $SnO_2$, 10–20 CuO, and 10–20 $MoO_3$ or 10–20 $WO_3$;
   (g) 100 $TiO_2$, 10–20 CuO, 5–10 $MoO_3$, and 5–10 $WO_3$;
   (h) 100 $SnO_2$, 10–20 CuO, 5–10 $MoO_3$, and 5–10 $WO_3$;
   (i) 100 of a total of a mixture of $TiO_2$ or $SnO_2$, 10–20 CuO, 5–10 $MoO_3$, and 5–10 $WO_3$.

9. A laser sensitive pigment according to claim 7, wherein the mica particles have an average size of between 5 and 50 microns.

10. A laser markable plastic object comprising a plastic resin having a laser sensitive pigment incorporated therein, wherein the laser sensitive pigment comprises at least one platelet-shaped substrate coated with a metal oxide coating comprising a marking component, wherein at least one marking component comprises $MoO_3$, $V_2O_5$, $Ag_2O$ or $PbO_2$.

11. A laser markable plastic object comprising a plastic resin having a laser sensitive pigment incorporated therein, wherein the laser sensitive pigment comprises at least one platelet-shaped mica substrate coated with a metal oxide coating comprising a marking component, wherein at least one marking component comprises CuO or $WO_3$.

12. A laser markable plastic object according to claim 10, wherein at least one platelet-shaped substrate comprises mica.

13. A laser markable plastic object according to claim 10, wherein the laser sensitive pigment is present in a markable portion of the plastic object in an amount of from 0.1% to 1%.

14. A laser markable plastic object according to claim 11, wherein the laser sensitive pigment is present in a markable portion of the plastic object in an amount of from 0.1% to 1%.

15. A laser markable plastic object comprising a plastic resin having a laser sensitive pigment according to claim 1 incorporated therein.

16. A laser markable plastic object according to claim 15, wherein the laser sensitive pigment is present in a markable portion of the plastic object in an amount of from 0.1% to 1%.

17. A laser markable plastic object comprising a plastic resin having a laser sensitive pigment according to claim 2 incorporated therein.

18. A laser markable plastic object according to claim 17, wherein the laser sensitive pigment is present in a markable portion of the plastic object in an amount of from 0.1% to 1%.

19. A laser markable plastic object comprising a plastic resin having a laser sensitive pigment according to claim 5 incorporated therein.

20. A laser markable plastic object according to claim 19, wherein the laser sensitive pigment is present in a markable portion of the plastic object in an amount of from 0.1% to 1%.

21. A method of laser marking a plastic comprising:
   providing a laser markable plastic object according to claim 15; and
   applying a Nd:YAG laser beam to a portion of the plastic to generate a mark.

22. A method of laser marking a plastic comprising:
   providing a laser markable plastic object according to claim 15; and
   applying a $CO_2$ laser beam to said laser markable portion of the plastic object to generate a mark.

23. A method of laser marking a plastic object comprising:
   providing a laser markable plastic object according to claim 15; and
   applying an excimer laser beam to a portion of the plastic object to generate a mark.

24. A method of laser marking a plastic object comprising:
   providing a laser markable plastic object according to claim 19; and
   applying an Nd:YAG laser beam to a portion of the plastic object to generate a mark.

25. A method of laser marking a plastic object comprising:
   providing a laser markable plastic object according to claim 19; and
   applying a $CO_2$ laser beam to a portion of the plastic object to generate a mark.

26. A method of laser marking a plastic object comprising:
providing a laser markable plastic object according to claim 19; and
applying an excimer laser beam to a portion of the plastic object to generate a mark.

27. A process for the preparation of a laser markable plastic object according to claim 10, comprising mixing resin with the laser sensitive pigment and then forming.

28. A process for the preparation of a laser markable plastic object according to claim 11, comprising mixing resin with the laser sensitive pigment and then forming.

29. A process for the preparation of a laser markable plastic object according to claim 15, comprising mixing resin with the laser sensitive pigment and then forming.

30. A molded article comprising the laser markable plastic according to claim 10.

31. A molded article comprising the laser markable plastic according to claim 11.

32. A molded article comprising the laser markable plastic according to claim 15.

33. A laser sensitive pigment according to claim 1, sensitive to Nd:YAG laser radiation, $CO_2$ laser radiation or excimer laser radiation.

34. A laser sensitive pigment comprising at least one platelet-shaped substrate coated with a mixed metal oxide coating, wherein the mixed metal oxide coating comprises a host component and a marking component, wherein the host component comprises at least one of $TiO_2$ or $SnO_2$, and wherein the marking component comprises at least one of CuO, $Ag_2O$, or $PbO_2$, and at least one of $MoO_3$, $WO_3$, or $V_2O_5$, and wherein the mixed metal oxide coating comprises a host component/marking component weight ratio of 1/0.1–0.4.

35. A radiation sensitive pigment comprising at least one platelet-shaped substrate coated with a mixed metal oxide coating, wherein the mixed metal oxide coating comprises a host component and a marking component, wherein the host component comprises at least one of $TiO_2$ or $SnO_2$, and wherein the marking component comprises at least one of $MoO_3$, $WO_3$, $V_2O_5$, $Ag_2O$, or $PbO_2$, and wherein the mixed metal oxide coating comprises a host component/marking component weight ratio of 1/0.1–0.4.

36. A radiation sensitive pigment comprising at least one platelet-shaped substrate coated with a mixed metal oxide coating, wherein the mixed metal oxide coating comprises a host component and a marking component, wherein the host component comprises $TiO_2$, and wherein the marking component comprises at least one of CuO, $MoO_3$, $WO_3$, $V_2O_5$, $Ag_2O$, or $PbO_2$, and wherein the mixed metal oxide coating comprises a host component/marking component weight ratio of 1/0.1–0.4.

37. A radiation sensitive pigment according to claim 5, wherein the mixed metal oxide coating is, in parts by weight, selected from the group consisting of:
(a) 100 $TiO_2$ and 10–40 CuO or 10–30 $MoO_3$;
(b) 100 of a total of a mixture of $TiO_2$ and $SnO_2$ plus 10–40 CuO or 10–30 $MoO_3$;
(c) 100 $TiO_2$, 10–20 CuO, and 10–20 $MoO_3$ or 10–20 $WO_3$;
(d) 100 $SnO_2$, 10–20 CuO, and 10–20 $MoO_3$ or 10–20 $WO_3$;
(e) 100 of a total of a mixture of $TiO_2$ and $SnO_2$, 10–20 CuO, and 10–20 $MoO_3$ or 10–20 $WO_3$;
(f) 100 $TiO_2$, 10–20 CuO, 5–10 $MoO_3$, and 5–10 $WO_3$;
(g) 100 $SnO_2$, 10–20 CuO, 5–10 $MoO_3$, and 5–10 $WO_3$;
(h) 100 of a total of a mixture of $TiO_2$ or $SnO_2$, 10–20 CuO, 5–10 $MoO_3$, and 5–10 $WO_3$.

\* \* \* \* \*